United States Patent

Lohrey et al.

[15] 3,643,231

[45] Feb. 15, 1972

[54] MONOLITHIC ASSOCIATIVE MEMORY CELL

[72] Inventors: Fred H. Lohrey; Siegfried K. Wiedmann, both of Poughkeepsie, N.Y.

[73] Assignee: International Business Machines Corporation, Armonk, N.Y.

[22] Filed: Apr. 20, 1970

[21] Appl. No.: 29,975

[52] U.S. Cl. ....................340/173 FF, 340/173 R, 307/238, 307/291

[51] Int. Cl. ....................G11c 11/40, H03k 3/286

[58] Field of Search ....................340/173 R, 173 FF; 307/238, 307/291

[56] References Cited

UNITED STATES PATENTS

| | | | |
|---|---|---|---|
| 3,548,386 | 12/1970 | Bidwell | 340/173 FF |
| 3,423,737 | 1/1969 | Harper | 340/173 |
| 3,551,899 | 12/1970 | Igarshi | 340/173 AM |

*Primary Examiner*—Terrell W. Fears
*Assistant Examiner*—Vincent P. Canney
*Attorney*—Hanifin and Jancin and James E. Murray

[57] ABSTRACT

This specification discloses an associative memory storage cell having two cross-connected transistors with the word line for the cell connected to the common emitters of the two transistors and having each of the bases of the two transistors connected to the base of an input/output transistor. This emitter of each of these input/output transistors is connected to a separate bit line and the collectors of the input/output transistors are connected together and to the associative sense amplifier. To associatively search the memory, one of the bit lines is lowered. This causes the input/output transistor connected to the lowered bit line to conduct and thereby give a no-match signal to the associative sense amplifier if its base is connected to the base of the conducting one of the two cross-connected transistors and it causes that transistor to remain nonconductive and thereby give a match signal to the associative sense amplifier if it is connected to the base of the nonconducting one of the two cross-connected transistors.

6 Claims, 3 Drawing Figures

INVENTORS
FRED H. LOHREY
SIEGFRIED K. WIEDMANN
BY James E. Murray
ATTORNEY

MONOLITHIC ASSOCIATIVE MEMORY CELL

BACKGROUND OF THE INVENTION

This invention relates to monolithic memories and more particularly to an associative storage cell for such memories.

In copending application Ser. No. 885,575, filed Dec. 5, 1969 and entitled "Monolithic Semiconductor Memory" a storage cell is described which has many characteristics which make it very desirous for use in monolithic memories. First of all, it requires very little power to operate. Secondly, it takes up very little chip area on the monolithic chips. And finally, it has fast operating speeds. In accordance with the present invention, that storage cell is modified to function as an associative memory while maintaining the mentioned advantages.

Therefore, it is an object of the present invention to provide an associative storage cell.

It is another object of the present invention to provide an associative storage cell that can be formed in a very small area of a monolithic chip.

It is a further object of this invention to provide an associative storage cell that operates rapidly and requires very little space when fabricated in monolithic form.

DESCRIPTION OF THE DRAWINGS

These and other objects, features and advantages of the invention will be apparent from the following more particular description of the preferred embodiment of the invention as illustrated in the drawings of which.

GENERAL DESCRIPTION OF THE INVENTION

Figure 1:
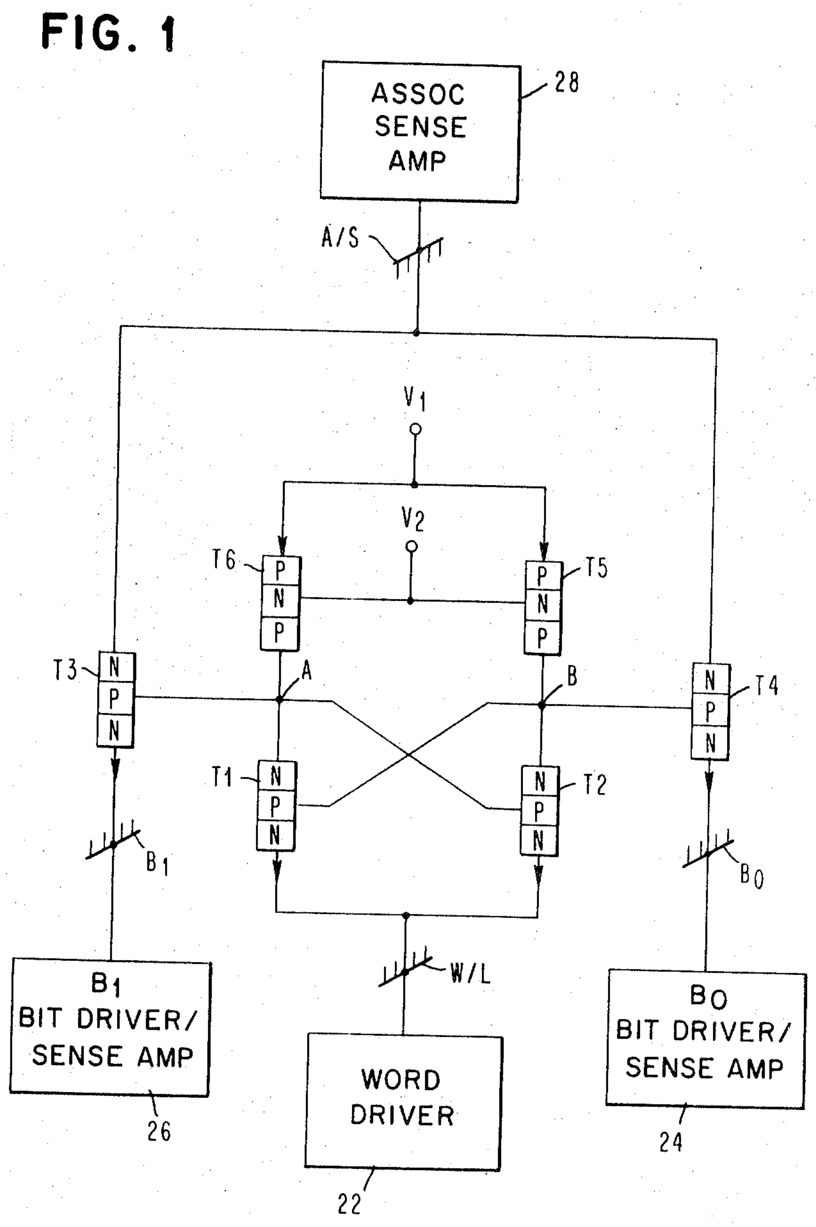
FIG. 1 is a schematic of a storage cell in accordance with applicants' invention.

FIG. 1 shows a storage cell with a directly cross-coupled transistor flip-flop that can be used as a base component of a monolithic memory. The two cross-connected NPN-transistors T1 and T2 have their emitter electrodes connected together and to the word line W/L for the cell while their base and collector electrodes are cross connected. In the collector circuits of each of the transistors T1 and T2 there is a controllable load transistor T6 and T5, respectively. The controllable load transistors T6 and T5 are PNP-devices which have their emitters connected to the operating potential V1 and their collectors connected to the collectors of transistors T1 and T2. The third electrodes of transistors T6 and V5 are linked with a common terminal V2. When the transistor T1 is conducting the potential at its collector or node A drops sufficiently to bias the base-to-emitter junction of transistor T2 off. Likewise, when transistor T2 is conducting the potential at its collector or node B biases the base-to-emitter junction of transistor T1 off. With transistor T2 conducting the flip-flop stores a binary "1" while when transistor T1 is conducting the flip-flop stores a binary "0". For reasons gone into in detail in the mentioned copending application, the internal resistance $\nabla VC_b/\nabla I_C$ is very high so that the two transistors T5 and T6 each act as a current source.

There are two additional transistors T3 and T4 in the storage cell which connect the bistable flip-flop to B1 and B0 bit lines and in accordance with the present invention to the associated sense line A/S. The collectors of transistors T3 and T4 are connected together and to the associated sense line A/S while the base of transistors T3 and T4 are connected to the base of transistors T2 and T1, respectively. Furthermore, the emitter of transistor T3 is connected to the B1 bit line and the emitter of transistor T4 is connected to the B0 bit line.

While the storage cell is not being accessed for reading and writing the potential on the word line W/L is maintained sufficiently low (approximately ground potential) by the word driver 22 so that the potentials at nodes A and B bias transistors T3 and T4 off thus isolating the flip-flops from the bit lines B0 and B1. This permits the bit lines B0 and B1 to be used for operations involving other words serviced by the bit lines B0 and B1 without disturbing the data stored in this storage cell.

To read the data stored in the flip-flop, the potential on the word line W/L is raised by the word driver 22 so that transistor T3 or T4 with its base connected to the base of conducting transistor T2 or T1 conducts and provides an output signal on the B1 or B0 bit line. For instance, assume a "0" is stored in the storage cell and that transistor T1 is therefore conducting. When the word line potential is raised, the node B increases sufficiently to cause the base-to-emitter junction of transistor T4 to conduct and place an output signal on the B0 bit line. The transistor T3 is not biased conductive by this increase in word line potential because the potential at node A is lower than at node B due to the saturation of transistor T1 and the potential difference between nodes A and B is sufficient to allow transistor T4 to conduct while transistor T3 is held off. In this connection it is not absolutely necessary that the read transistors of the nonaddressed cells sharing the B0 and B1 bit lines with the addressed cell be completely off. It is sufficient that the read current originating from the addressed cell exceeds the sum of the emitter currents from the other transistor T3 or T4 of the other memory cells connected to the bit lines. By means of a differential amplifier the state of the cell can be accurately determined from the difference in the potentials or currents on the bit lines B0 and B1.

To write data into the storage cell, the word line W/L is again raised by the word driver. Simultaneously, the potential on one of the bit lines B0 or B1 is decreased by B0 bit driver 24 or B1 bit driver 26 causing the transistor T3 or T4 to conduct and reduce the potential at node A or node B until the transistor T1 or T2, with its base directly connected to the node, is biased off and the other transistor is biased on. For instance, assume a "0" is stored in the cell so that transistor T1 is conducting and transistor T1 is to be rendered nonconductive to store a "1" in the storage cell. Then, when the word line W/L potential is raised as during a read operation, the potential on the B1 bit line is reduced pulling the potential at node B down with it. This causes transistor T1 to conduct less and thereby start a regenerative action that results in the turning off of transistor T1 and turning on of transistor T2.

Up until now the operation of the storage cell has been described as taking place as though V1 is maintained fixed. However, as pointed out in the above-mentioned copending application, the collector currents from the two PNP-transistors T6 and T5 can be controlled over a wide range by changing the emitter current of the two transistors T6 and T5. In turn, the emitter current is controlled over a wide range by means of slight voltage changes in V1. Thus the resistance of the cell can be made very low by varying V1 so that reading and writing of data in the cell can be accomplished rapidly with very low supply voltages. This results in very low power dissipation which is regarded as a particular advantage.

Up until now we have described the reading and writing operation of the storage cell which is essentially the same as in the above-mentioned copending application. In accordance with the present invention, an associative search can also be performed with the storage cell. For instance, assume that in the associative search for a stored "0" is being performed. Then the B1 bit line is reduced to approximately the same potential as the W/L word line (approximately ground potential). If a "1" is stored in the storage cell and transistor T2 is therefore on, transistor T3 will conduct since node A is high enough to support conduction through transistor T3. This causes current flow in the associative sense line A/S which is detected by the associative sense amplifier as a no-match condition. However, if a "0" is stored in the storage cell and transistor T1 is therefore conducting it will be in saturation setting the potential at node A and at a value which is insufficient to cause conduction of transistor T3. Transistor T3 then remains nonconductive so that no current flows from the storage cell to the associative sense amplifier 28. If all the storage cells connected to the common associative sense word line A/S provide such a match signal the whole word matches giving a match indication from the associative sense amplifier 28.

In a similar manner the storage cell can be associatively searched for a stored "1". This is accomplished by lowering the bit line potential on the bit line B0 to approximately W/L word line potential. If a "0" is stored in the storage cell transistor T1 is therefore conducting, the potential at node B will be sufficient to cause transistor T4 to conduct and provide current on the A/S associative sense line. Such conduction of any storage cell in the word is sufficient to indicate a no-match condition to the associative sense amplifier 28. However, if a "1" is stored in the storage cell and transistor T2 is therefore conducting, it will be in saturation, setting the potential at node B at a level that biases transistor T4 off so that no current flows from the storage cell to the A/S associative sense line. If all the storage cells of the word line provide such a match signal, no current will flow in the associative sense line thereby providing a match indication to the associative sense amplifier 28.

Figure 2:
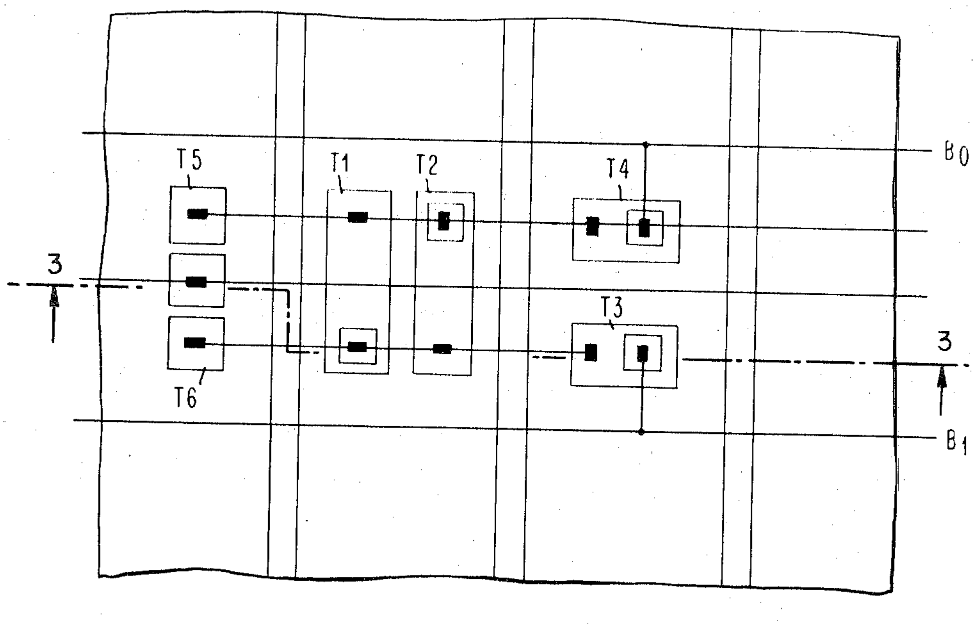
FIG. 2 is a plane view of a monolithic layout of the storage cell in FIG. 1.
Figure 3:
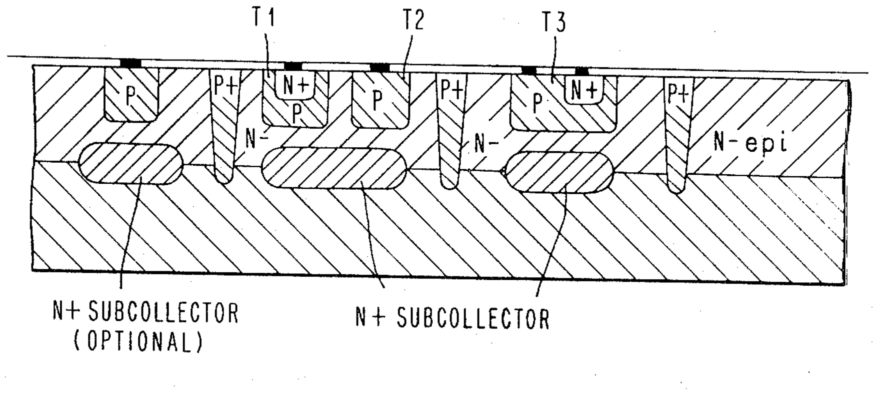
FIG. 3 is a section taken along line 3—3 in FIG. 2.

The storage cell described in connection with FIG. 1 may be fabricated in monolithic form as illustrated in FIGS. 2 and 3. Here the diffusions are numbered with the numbers of the transistors they correspond to in FIG. 1. A word of storage cells can be fabricated in the three parallel isolation zones, one containing the transistors T1 and T2, another containing transistors T3 and T4 and the third containing the transistors T5 and T6. The word line conduction W/L comprises the buried layer under the transistors T1 and T2, while the associative sense line conduction A/S constitutes the buried layer under transistors T3 and T4.

While the invention has been shown and described with reference to a preferred embodiment thereof it will be understood by those skilled in the art that various changes in form and details may be made therein without departing from the spirit and scope of the invention.

What is claimed is:

1. In a storage cell having a pair of transistors with bases and collectors cross connected, and emitters connected to a word line, and having input/output transistors each with a base coupled to the base of one of the cross-connected transistors and emitter connected to a different bit line of a bit line pair so that the data in the storage cell can alternatively be electrically coupled and decoupled from the bit lines, the improvement comprising the collectors of the two input/output transistors being connected together and to a common associative sense detector and means for raising and lowering the potential on the bit lines independently of one another so that the storage cell can be interrogated associatively by raising and lowering the potentials on the bit lines.

2. The storage cell of claim 1 including a load transistor for each of the cross-connected transistors each having its collector connected to the collector of a cross-connected transistor and an emitter connected to a source of driving potential.

3. The storage cell of claim 2 wherein said load transistors are of one conductivity type and the cross-connected transistors are of another conductivity type.

4. The structure of claim 3 wherein said load transistors are PNP-transistors and the cross-connected transistors are NPN-transistors.

5. The structure of claim 1 wherein the two cross-connected transistors are formed with a common emitter region.

6. The structure of claim 4 wherein the load transistors are lateral transistors with a common emitter region and separate collector regions formed in a common base region.

* * * * *